US008966755B2

(12) United States Patent
McMahon et al.

(10) Patent No.: US 8,966,755 B2
(45) **Date of Patent: *Mar. 3, 2015**

(54) ASSEMBLY FIXTURE FOR A STATOR VANE ASSEMBLY

(75) Inventors: Michael E. McMahon, Shapleigh, ME (US); Steven J. Feigleson, Falmouth, ME (US); Dennis R. Tremblay, Biddeford, ME (US)

(73) Assignee: United Technologies Corporation, Hartford, CT (US)

( * ) Notice: Subject to any disclaimer, the term of this patent is extended or adjusted under 35 U.S.C. 154(b) by 114 days.

This patent is subject to a terminal disclaimer.

(21) Appl. No.: 13/483,501

(22) Filed: May 30, 2012

(65) Prior Publication Data

US 2012/0233858 A1 Sep. 20, 2012

Related U.S. Application Data

(63) Continuation-in-part of application No. 13/010,174, filed on Jan. 20, 2011.

(51) Int. Cl.
*B23P 6/00* (2006.01)
*F01D 9/04* (2006.01)
*F01D 25/28* (2006.01)

(52) U.S. Cl.
CPC .............. *F01D 9/042* (2013.01); *F01D 25/285* (2013.01); *F05D 2230/60* (2013.01); *F05D 2240/10* (2013.01); *F05D 2240/55* (2013.01)
USPC .... 29/889.21; 29/281.1; 415/191; 415/208.2; 269/85; 269/309; 269/37

(58) Field of Classification Search
CPC ........ B23P 15/006; B23P 19/04; B23P 15/04; F01D 9/042; F01D 9/044; F01D 25/285; F01D 25/246; B23K 37/0426; B23K 37/0461; B25B 11/11; B25B 5/003; B25B 11/02; B25H 1/00; B25H 1/0007; B26D 7/02; B23Q 3/183; B23Q 16/00
USPC ................. 29/889.1–889.21, 281.1; 415/191, 415/208.2; 269/9, 43, 56, 287, 85, 58, 309, 269/37
See application file for complete search history.

(56) References Cited

U.S. PATENT DOCUMENTS 3,636,609 A * 1/1972 Stahl .............................. 269/37
5,232,340 A 8/1993 Morgan (Continued)

OTHER PUBLICATIONS

International Search Report and Written Opinion for PCT Application No. PCT/US2013/040042 mailed on Aug. 21, 2013.

(Continued)

*Primary Examiner* — David Bryant
*Assistant Examiner* — Jun Yoo
(74) *Attorney, Agent, or Firm* — Carlson, Gaskey & Olds, P.C.

(57) ABSTRACT

A disclosed fixture for assembling a stator vane assembly for a gas turbine engine includes an outer locating ring including a plurality of outer locating pins defining a position for each of a plurality of vanes relative to an outer fairing and an inner locating ring including a plurality of inner locating rings defining a position of each of the plurality of vanes relative to an inner fairing. A clamp section includes a clamp portion and a clamp pin that define an angular orientation of each of the plurality of vanes relative to each of the inner and outer fairings, and an inner locating section supporting a plurality of radial locating pins defining a radial position of each of the plurality of vanes relative to the inner and outer fairings.

8 Claims, 10 Drawing Sheets

(56) References Cited

U.S. PATENT DOCUMENTS

| | | | |
|---|---|---|---|
| 5,281,089 | A | 1/1994 | Brown et al. |
| 5,380,155 | A | 1/1995 | Varsik et al. |
| 5,494,404 | A | 2/1996 | Furseth et al. |
| 5,547,342 | A | 8/1996 | Furseth et al. |
| 5,645,398 | A | 7/1997 | Benoist et al. |
| 6,164,903 | A | 12/2000 | Kouris |
| 6,202,302 | B1 | 3/2001 | Descoteaux |
| 6,343,912 | B1 | 2/2002 | Manteiga et al. |
| 6,409,472 | B1 | 6/2002 | McMahon et al. |
| 6,425,736 | B1 | 7/2002 | McMahon et al. |
| 6,543,995 | B1 | 4/2003 | Honda et al. |
| 6,910,859 | B2 | 6/2005 | Bluhm et al. |
| 7,413,400 | B2 | 8/2008 | Barnett |
| 7,494,316 | B2 | 2/2009 | Barnett et al. |
| 7,637,718 | B2 | 12/2009 | Barnett et al. |
| 2007/0104574 | A1 | 5/2007 | Ashkey et al. |
| 2009/0162192 | A1 | 6/2009 | McCaffrey |
| 2009/0208332 | A1 | 8/2009 | Weinstein et al. |
| 2010/0166545 | A1 | 7/2010 | Schuler et al. |
| 2010/0254804 | A1 * | 10/2010 | Harper .......................... 415/119 |
| 2010/0272565 | A1 | 10/2010 | Cheung |

OTHER PUBLICATIONS

International Preliminary Report on Patentability for International Application No. PCT/US2013/040042 mailed Dec. 11, 2014.

* cited by examiner

ASSEMBLY FIXTURE FOR A STATOR VANE ASSEMBLY

CROSS REFERENCE TO RELATED APPLICATION

This application is a continuation in part of U.S. application Ser. No. 13/010,174 filed on Jan. 20, 2011.

BACKGROUND

A gas turbine engine typically includes a fan section, and a core engine section including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. A direct drive gas turbine engine includes a fan section driven by the low spool such that the low pressure compressor, low pressure turbine and fan section rotate at a common speed in a common direction. A speed reduction device such as an epicyclical gear assembly may be utilized to drive the fan section such that the fan section may rotate at a speed different than the turbine section so as to increase the overall propulsive efficiency of the engine.

Some front architectures support the stator vanes relative to inner and outer fairings using rubber potting. Because there are no fixed features or fasteners used to secure vanes within the fairings, assembly can be difficult and time consuming.

Accordingly, it is desirable to design and develop assembly techniques and devices that simplify and speed assembly.

SUMMARY

A method of assembling a gas turbine engine front architecture according to an exemplary embodiment of this disclosure, among other possible things includes securing inner and outer fairings within a fixture relative to one another, securing multiple vanes between the inner and outer fairing within the fixture, applying a curable material at an interface between each of the multiple vanes and the inner and outer fairings, curing the curable material while maintaining a relative position between the multiple vanes and the inner and outer fairings, and releasing the multiple vanes and the inner and outer fairings from the fixture.

A further embodiment of the foregoing method, including positioning each of the multiple vanes within an opening of each of the inner and outer fairings.

A further embodiment of any of the foregoing methods, including positioning each of the multiple vanes by defining a first plane with at least three (3) contact points on the fixture, a second plane with at least two (2) contact points on the fixture and a third plane with at least one (1) contact point defined on the fixture.

A further embodiment of any of the foregoing methods, including defining the first plane with an outer locator pin on an outer locating ring of the fixture, an inner locator pin on an inner locating ring and a clamp disposed between the inner and outer locating rings.

A further embodiment of any of the foregoing methods, including a single clamp for holding each of the vanes in position.

A further embodiment of any of the foregoing methods, wherein the single clamp is disposed between the inner locating pin and the outer locating pin and includes a clamp portion supported on a clamp pin with the vane being clamped between the clamp portion and the clamp pin.

A further embodiment of any of the foregoing methods, including defining the second plane with a surface of an outer locating ring and an inner locating ring.

A further embodiment of any of the foregoing methods, including defining the third plane with a radial locating pin supported radially inward of the inner fairing.

A further embodiment of any of the foregoing methods, wherein the plurality of vanes are held within the fixture during curing of the curable material.

A method of assembling a gas turbine engine front architecture according to an exemplary embodiment of this disclosure, among other possible things includes A fixture for assembling a stator vane assembly for a gas turbine engine according to an exemplary embodiment of this disclosure, among other possible things includes, an outer locating ring including a plurality of outer locating pins defining a position for each of a plurality of vanes relative to an outer fairing, an inner locating ring including a plurality of inner locating rings defining a position of each of the plurality of vanes relative to an inner fairing, a clamp section including a clamp portion and a clamp pin defining an angular orientation of each of the plurality of vanes relative to each of the inner and outer fairings, and an inner locating section supporting a plurality of radial locating pins defining a radial position of each of the plurality of vanes relative to the inner and outer fairings.

A further embodiment of the foregoing fixture, wherein the fixture defines a first plane with at least three (3) contact points, a second plane with at least two (2) contact points and a third plane with at least one (1) contact point.

A further embodiment of any of the foregoing fixtures, wherein the outer locator pin on the outer locating ring of the fixture, the inner locator pin on the inner locating ring and the clamp pin define the first plane.

A further embodiment of any of the foregoing fixtures, wherein the clamp portion is supported on the clamp pin and is configured to hold the vane against the clamp pin, the inner locating pin and the outer locating pin.

A further embodiment of any of the foregoing fixtures, including a fastener for applying a desired pressure to a corresponding one of the plurality of vanes for holding the vane within the defined first, second and third planes.

A further embodiment of any of the foregoing fixtures, wherein the outer locating pin extends transversely from an outer locating surface and the inner locating pin extends transversely from an inner locating surface and the second plane is defined by the outer and inner locating surfaces adjacent the corresponding inner and outer locating pins.

A further embodiment of any of the foregoing fixtures, wherein the radial locating pins include a locating surface transverse to the first plane.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
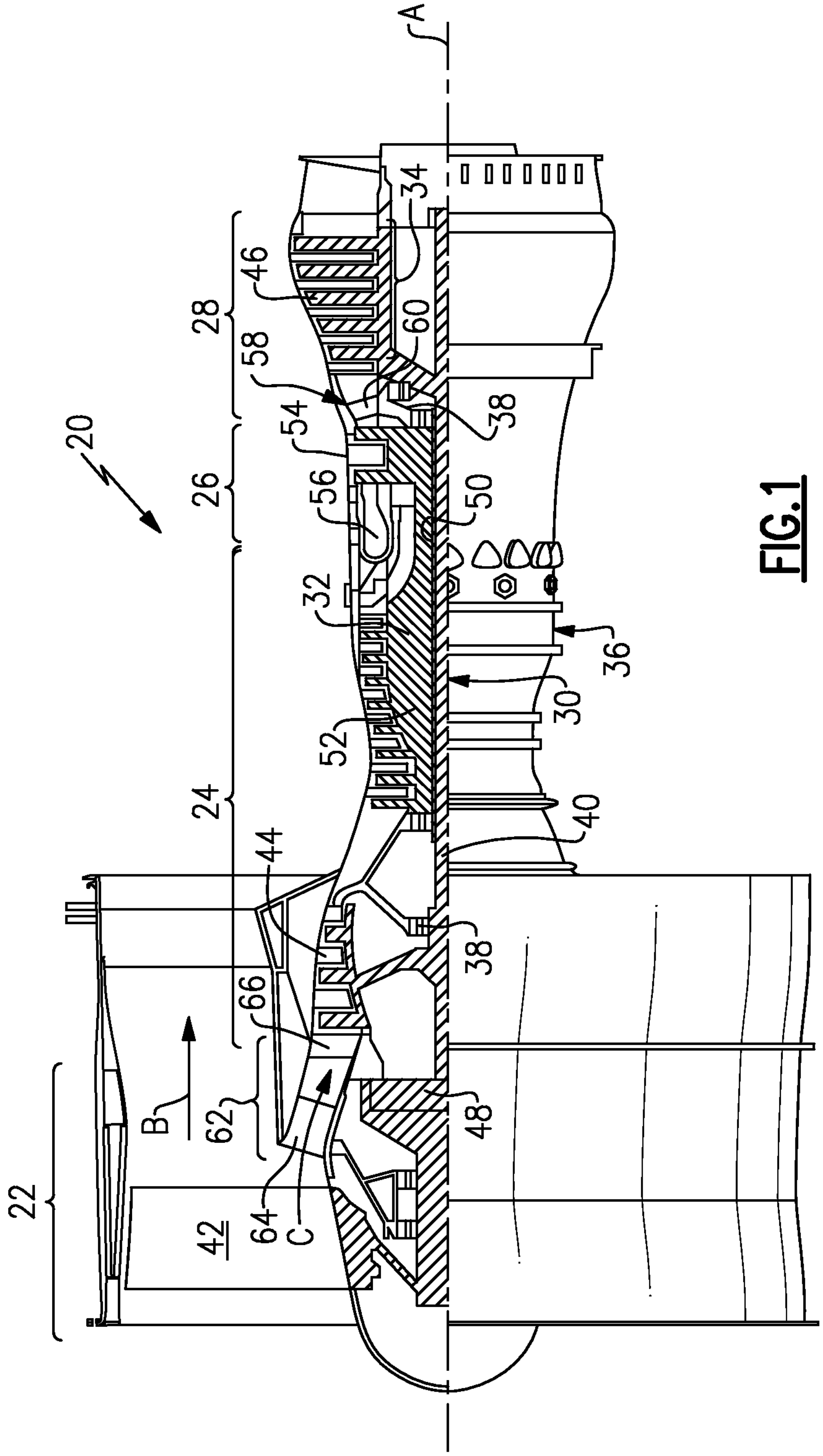
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

The example gas turbine engine 20 includes a front architecture 62 that includes a plurality of stator vanes 64. The plurality of stator vanes 64 are disposed aft of the fan section 22 and fan blades 42 at the inlet for core air flow C. The plurality of stator vanes 64 are disposed forward of a plurality of inlet guide vanes 66 that are disposed prior to a low pressure compressor 44. The plurality of stator vanes 64 are arranged circumferentially about the engine axis A within the inlet for core engine flow C.

Figure 2:
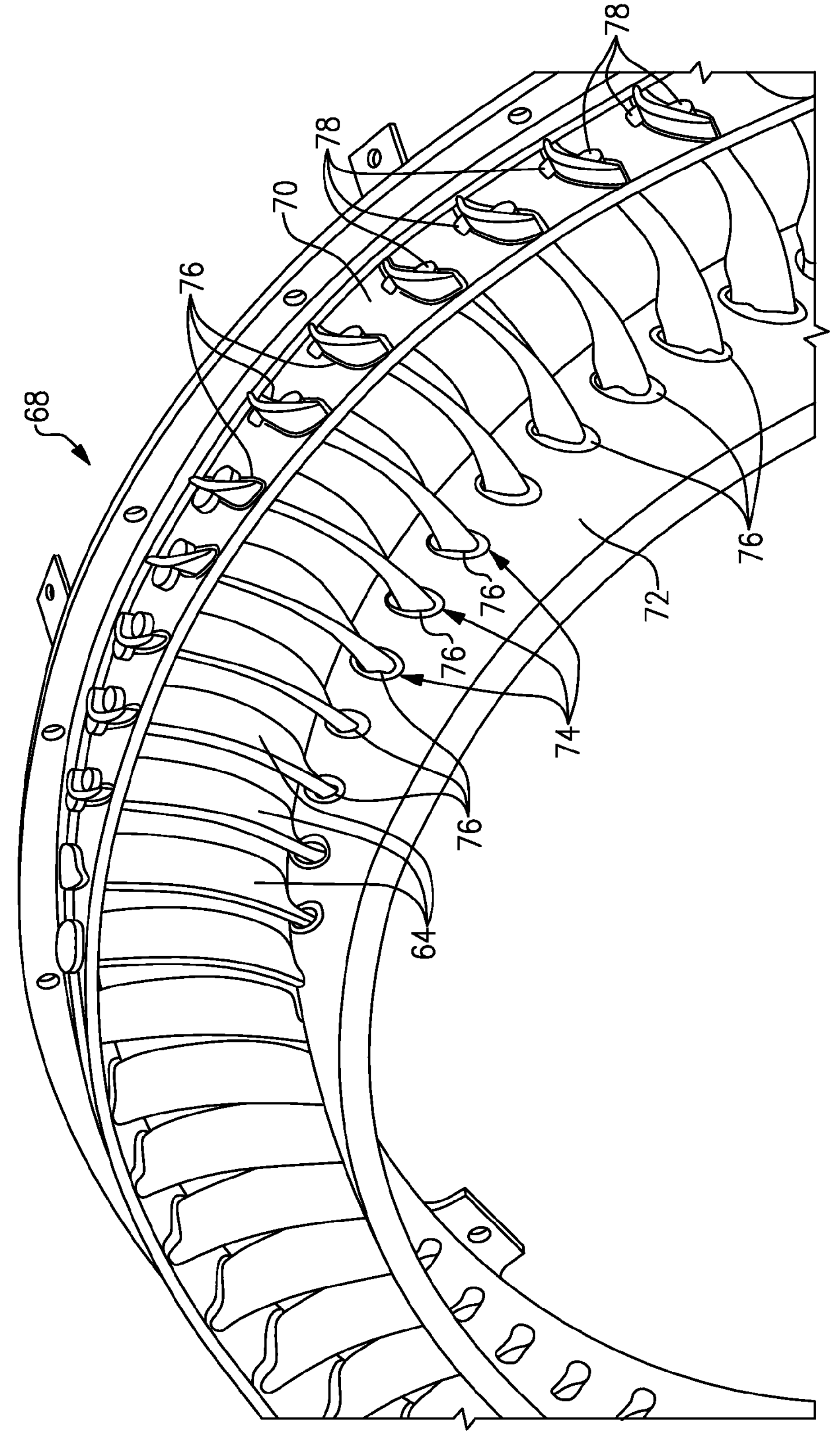
FIG. 2 is a perspective view of an example stator vane assembly.

Referring to the FIG. 2, the stator vanes 64 are part of a stator vane assembly 68 that includes an outer fairing 70 and an inner fairing 72. The plurality of stator vanes 64 extend between the inner fairing 72 and the outer fairing 70.

Figure 4:
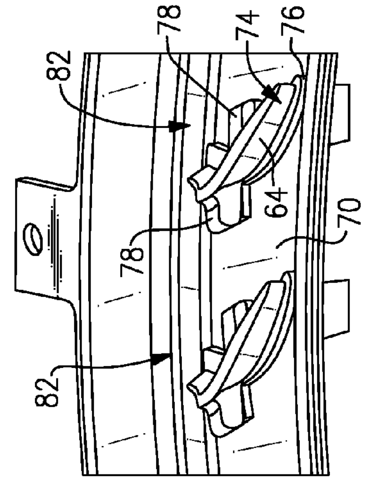
FIG. 4 is a perspective view of a top portion of the example stator vane assembly.
Figure 3:
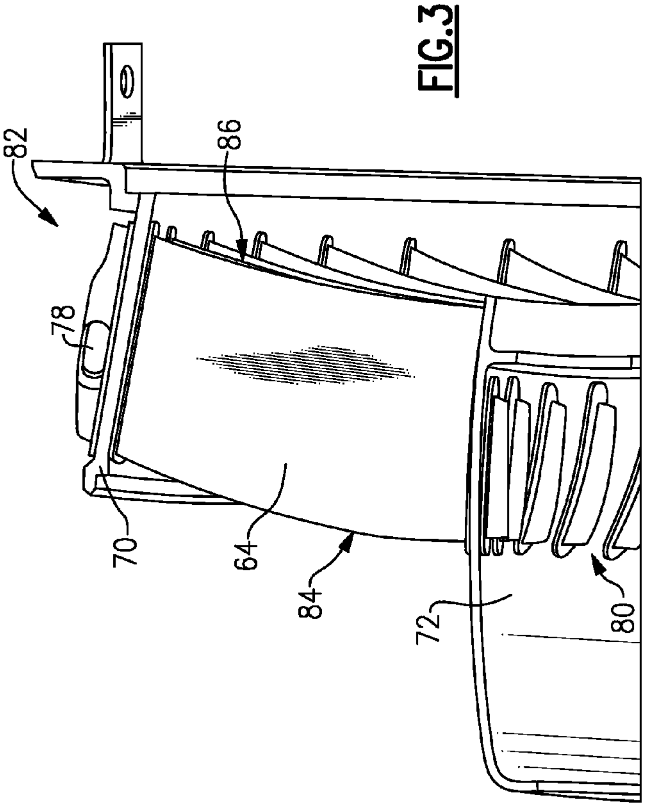
FIG. 3 is a partial schematic view of vanes for the example stator vane assembly.
Figure 5:
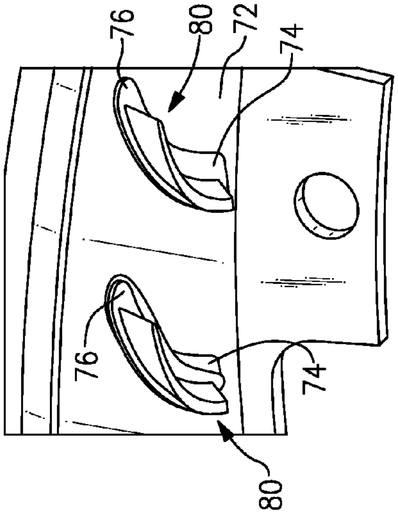
FIG. 5 is a bottom view of the example stator vane assembly.

Referring to FIGS. 3, 4, and 5 with continued reference to FIG. 2, the stator vanes 64 are supported within openings or slots 74 defined within each of the inner and outer fairings 72, 70. Each of the stator vanes 64 includes an inner end 80, an outer end 82, a leading edge 84 and a trailing edge 86. Each of the stator vanes 64 are supported within the openings 74 by a sealant 76. The example sealant 76 is a curable material that remains flexible once cured. The stator vanes 64 are mounted within the openings 74 by way of the curable sealant material 76.

The sealant 76 provides a bonded joint between the inner and outer fairings 70, 72 and is injected into the openings and within gaps between each of the vanes 64 and the corresponding slot 74 to vibrationally isolate the outer and inner fairings 70, 72 from the stator vanes 64.

Each of the stator vanes 64 include tabs 78 that secured the vane 64 within the outer fairing 70 and prevents it from sliding through the opening 74. However, it is the sealant 76 that provides the joint that maintains each of the vanes 64 in a desired position relative to the other vanes 64 and each of the outer and inner fairings 70, 72. Assembly of the stator vane assembly 68 requires specific positioning of each of the vanes 64 within corresponding openings 74. Positioning within the openings 74 is provided such that the vanes 64 themselves do not engage the outer and inner fairings 70, 72. An assembly fixture is utilized to define and maintain a relative position between the plurality of stator vanes 64 and the outer and inner fairings 70, 72 while the sealant 76 is applied and cured to form the completed stator vane assembly 68.

Figure 6:
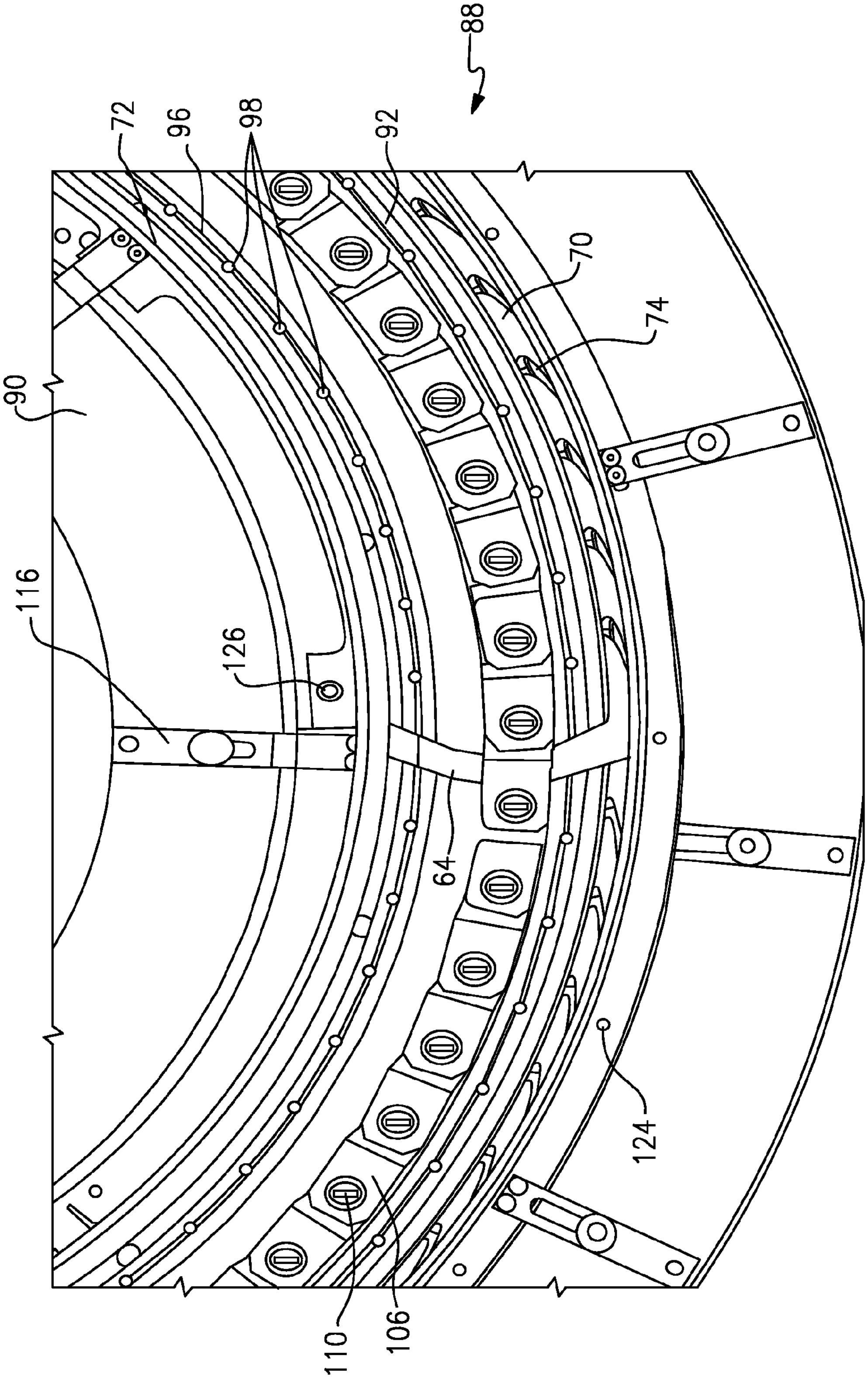
FIG. 6 is a top view of a fixture for assembling a stator vane assembly.
Figure 7:
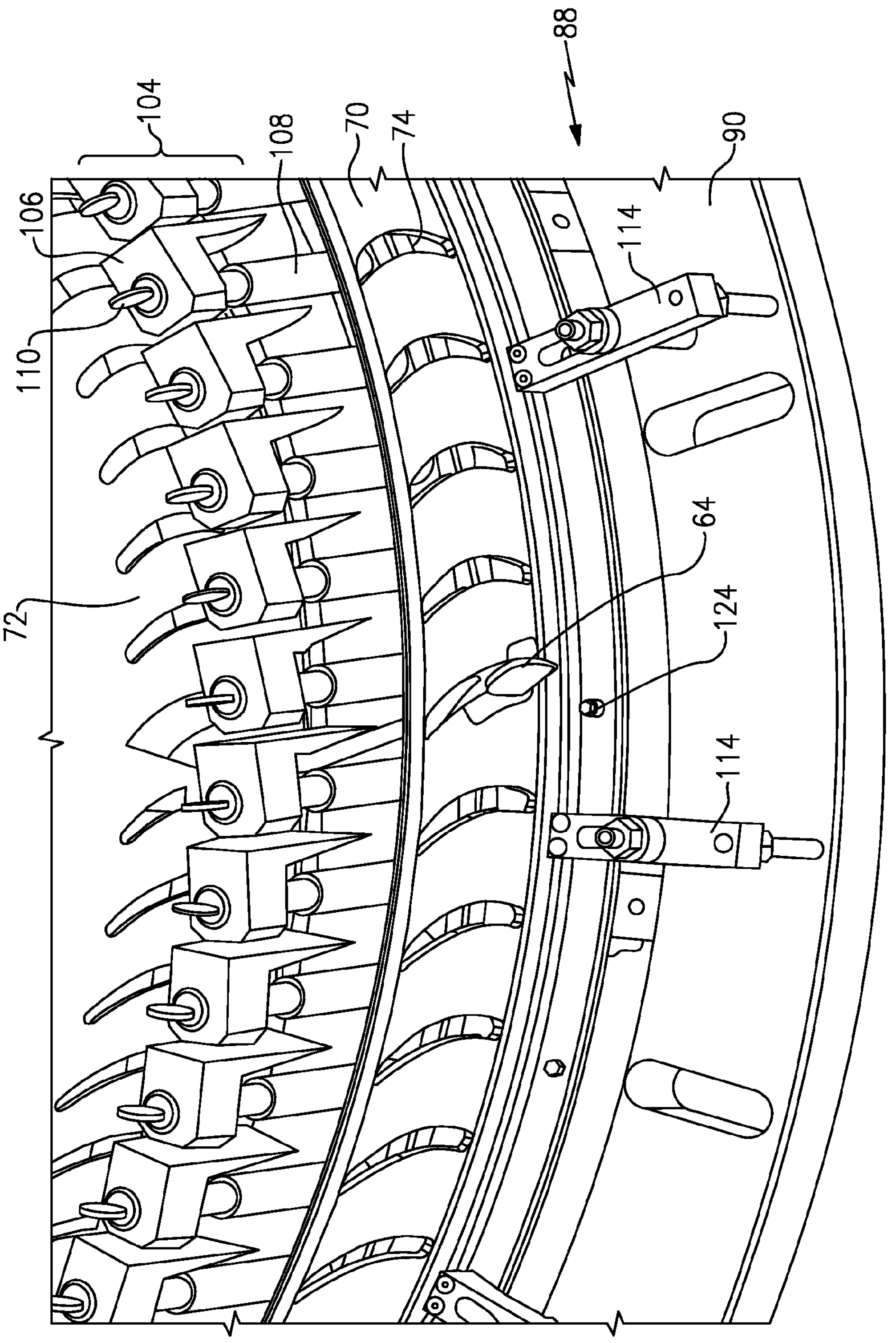
FIG. 7 is a perspective view of an outer portion of the example stator fixture for assembling a stator vane assembly.

Referring to FIGS. 6 and 7, an example disclosed assembly fixture 88 includes a base 90 that supports the outer fairing 70 and the inner fairing 72 along with the plurality of stator vanes 64 in a desired position for assembly including the application and curing of the sealant 76 (FIGS. 4 and 5). The example assembly fixture 88 defines the specific datum planes and points required to properly align each of the plurality of vanes 64 relative to adjacent vanes and the outer and inner and fairings 70, 72.

The example fixture assembly 88 includes the base 90 that holds clamps 114 that are provided to hold the outer fairing 70 in place. The base 90 also includes pins 124 that align with openings within the fairing 70 to align the outer fairing 70.

An outer locating ring 92 includes a plurality of locating pins 94 disposed radially inward of the mounted outer fairing 70. An inner locating ring 96 is disposed radially inward of the outer locating ring 92 and includes inner locating pin 98. A clamp section 104 is disposed between the inner and outer locating rings 96, 92 and includes a clamp portion 106 supported on a clamp pin 108.

The inner fairing 72 is supported on an inner portion of the base 90 and held in place by inner clamps 116. Similarly, the outer fairing 70 is held in place by outer clamps 114. The inner locating ring 92 and the outer rotating ring 96 includes surfaces 100, 102 that support the vane 64 within the openings 74.

Figure 8B:
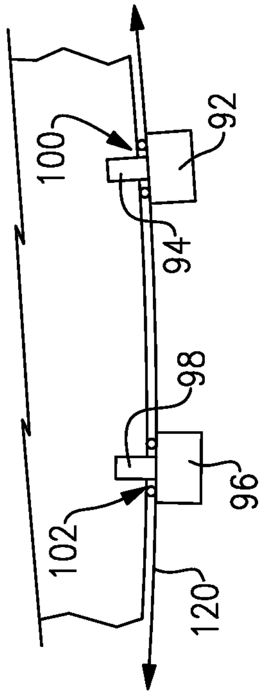
FIG. 8*b* is a schematic representation of a datum plane established by the example fixture assembly.
Figure 8A:
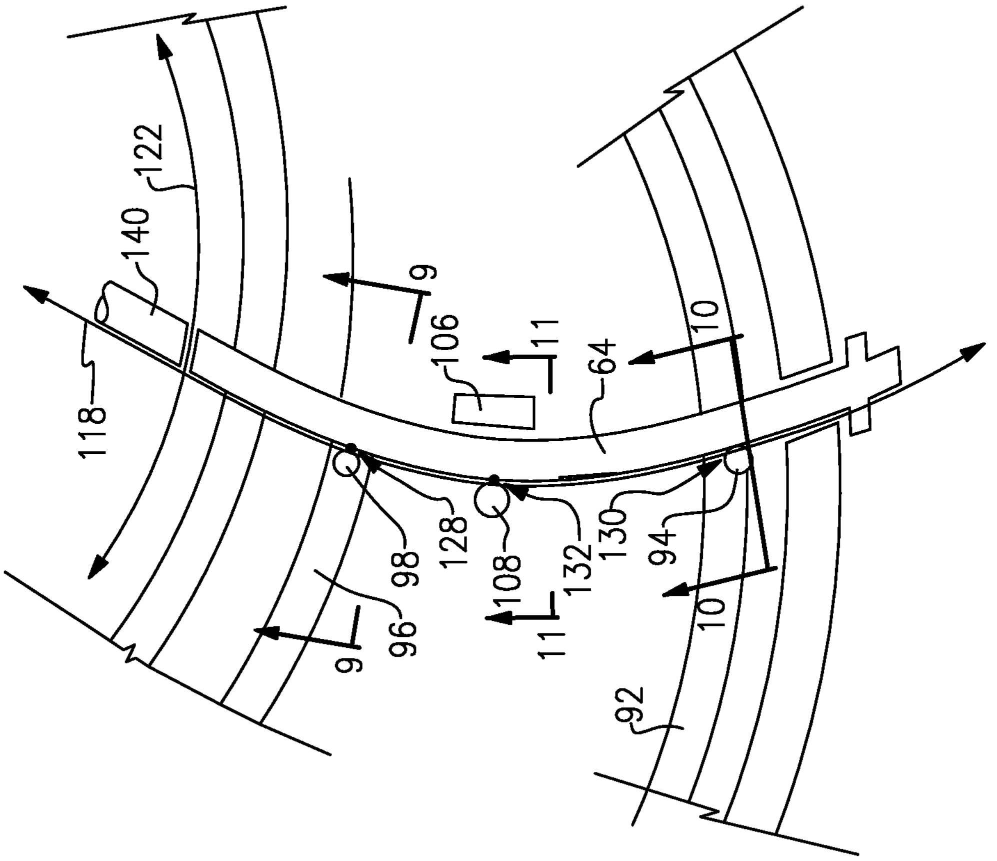
FIG. 8*a* is a schematic view of the datum planes established by the example fixture assembly.

Referring to FIGS. 8*a* and 8*b*, with continued reference to FIGS. 6 and 7, the inner and outer locating rings 96, 92 along within the clamp section 104 define three datum planes for each vane 64 relative to the outer and inner fairings 70, 72. FIGS. 8*a* and 8*b* are schematic representations illustrating the planes utilized to align the vanes 64 relative to the fairings 70, 72.

In this example, a first plane 118 is defined along a surface of the vane 64 that is transverse to a surface of the base 90. A second plane 120 (FIG. 8B) is defined along the base 90 and along the surfaces 100 and 102 of the inner and outer locating rings 96, 92. A third datum plane 122 is defined at the radially inner most position and sets a radial position of the vane 64.

The first plane 118 is defined by the inner locating pin 98, the outer locating pin 94 and a clamp post 108. Each of the inner pin 98, the outer pin 94, and the clamp post 108 defines a point along the first plane 118. In this example, the inner locating pin 98 defines a point 128. The outer locating pin 94 defines another point 130 between the pin 94 and the vane 64. The clamp post 108 defines a third locating point 132 between the post 108 and the vane 64.

The second plane 120 (FIG. 8*b*) is defined by the surface 100 of the outer locating ring 92 and the surface 102 of the inner locating ring 92. The surfaces 100 and 102 are disposed adjacent the corresponding locating pin 94, 98. The radial position defined as plane 122 is defined by the radial pin 140 that abuts the inner end 80 of the vane 64.

Figure 9:
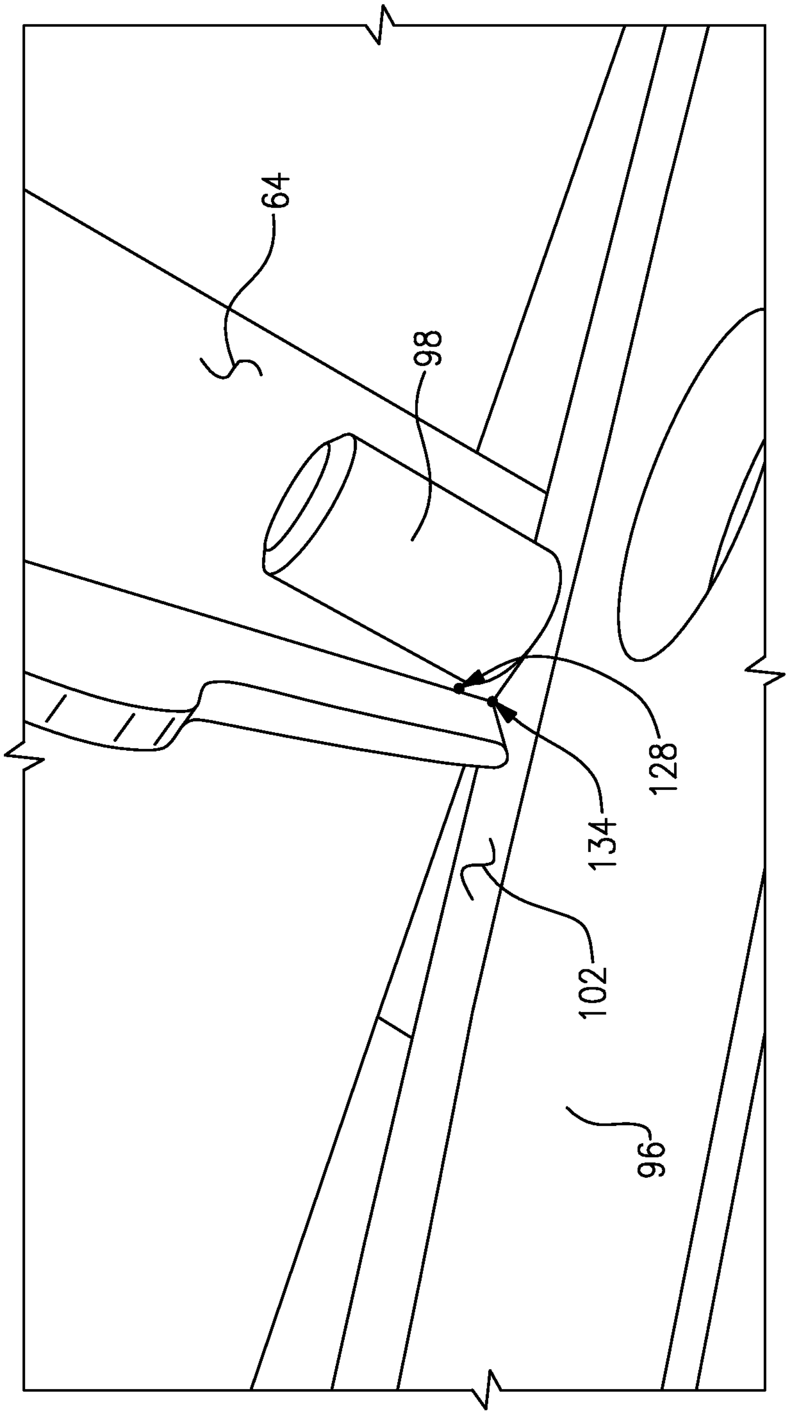
FIG. 9 is an enlarged view of datum planes defined by an outer locating ring.

Referring to FIG. 9, with continued reference to FIGS. 8*a* and 8*b*, the example fixture 88 includes the inner locating ring 96 that includes the surface 102 and the locating pin 98. The surface 102 defines the locating point 134 for the second plane 120. The locating pin 98 defines the first point 128 along the plane 118. The vane 64 is abutted against the pin 98 and the bottom surface 102 to set one point along the first plane 118 and the second plane 120.

Figure 10:
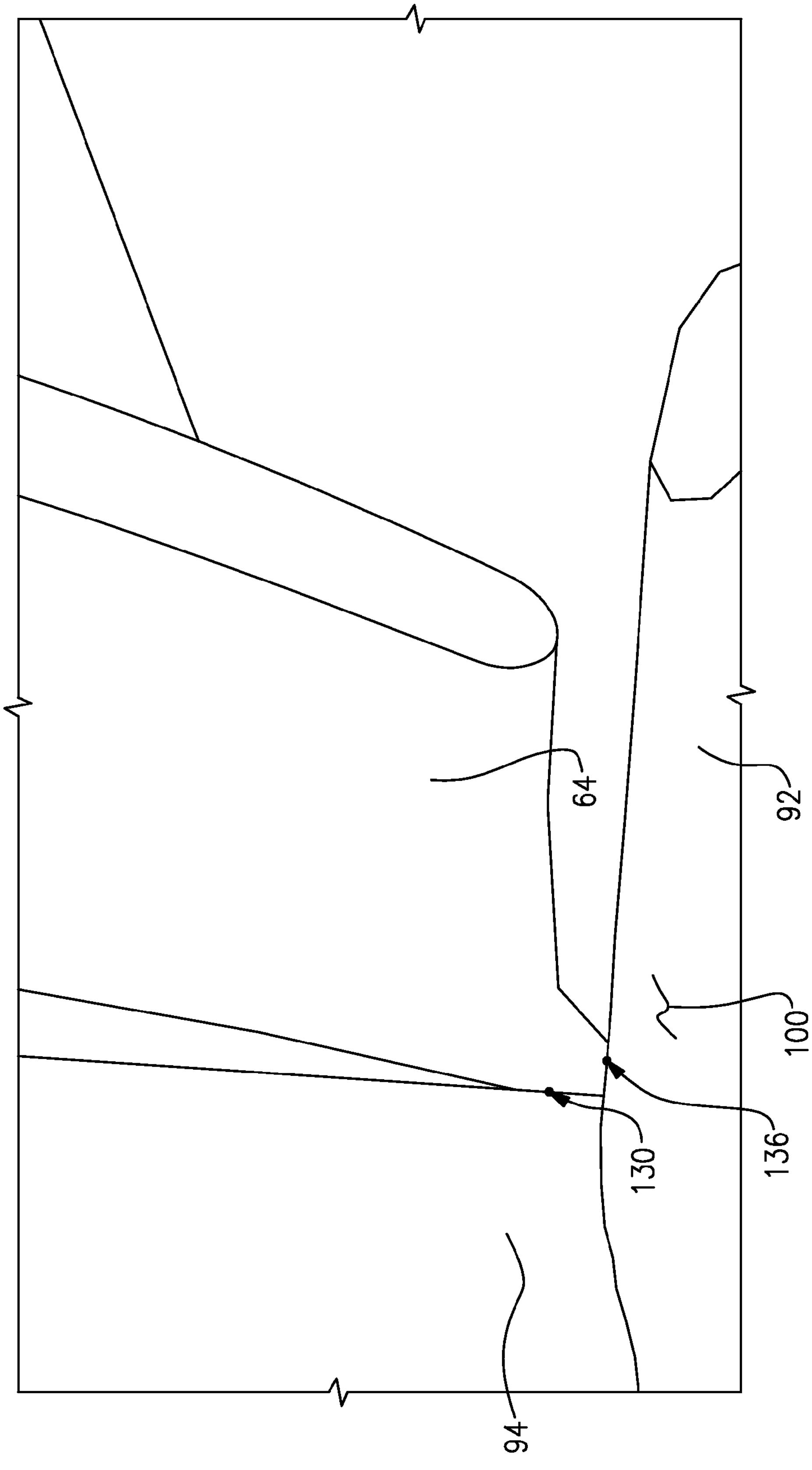
FIG. 10 is an enlarged view of data points defined by an example outer locating ring.

Referring to FIG. 10 with continued reference to FIGS. 8*a* and 8*b*, the outer locating ring 92 includes the surface 100 and the locating pin 94. The vane 64 is abutted against the surface 100 and the pin 94. The pin 94 defines the locating point 130 that is a second point along the plane 118. The outer ring surface 100 defines another point 136 that defines a second point along the plane 120.

Figure 11:
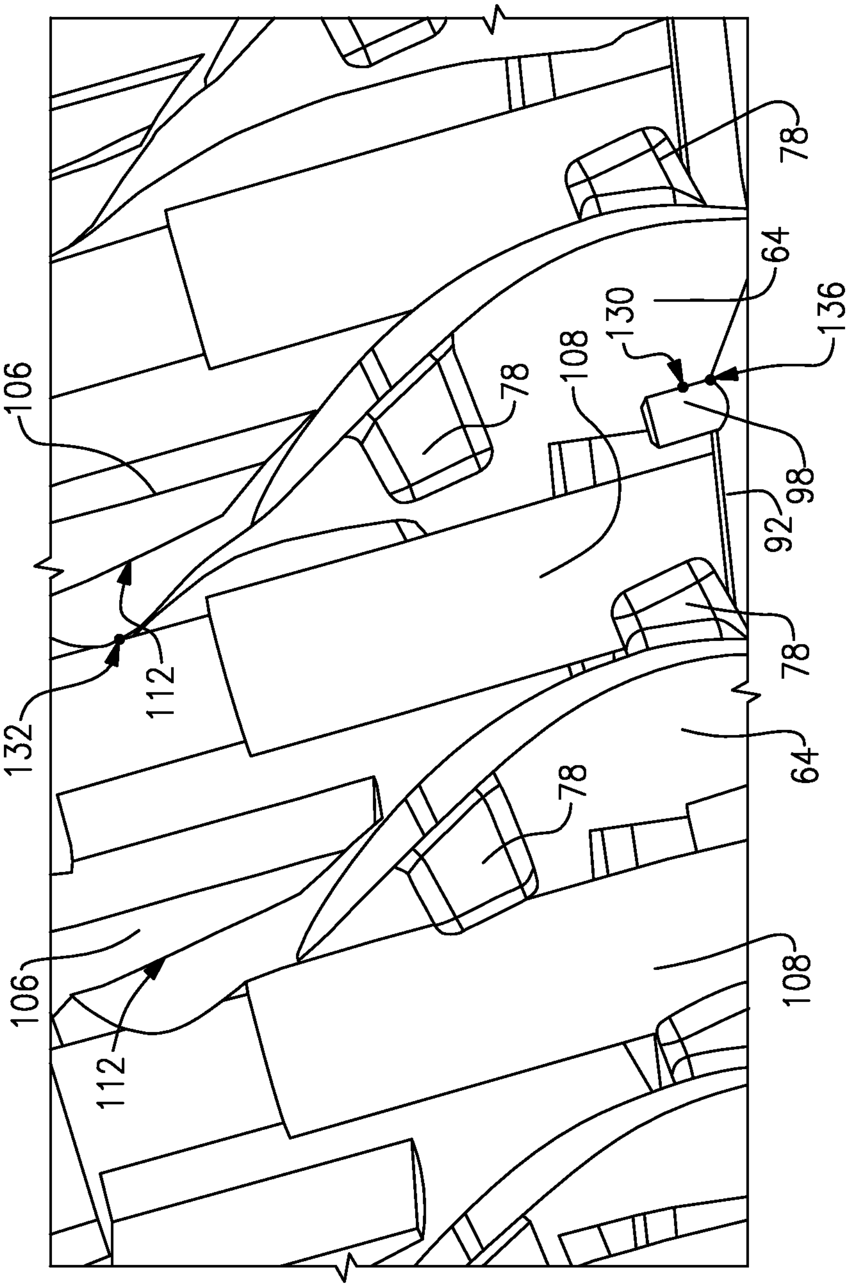
FIG. 11 is an enlarged view of a datum point established by an example clamping section.

Referring to FIG. 11, with continued reference to FIGS. 8*a* and 8*b*, a third point along the plane 118 is defined by the clamp post 108. The example clamp section 104 includes the clamp post 108 that extends upwardly from the base 90. The example clamp post 108 includes a point 132 onto which the vane 64 comes into contact. The example point 132 defines a third point along the plane 118. Accordingly, the example vane 64 abuts the outer locating pin 94, the inner locating pin 98, and the clamp pin 108 to define the first plane 118. As appreciated, the first plane 118 includes a specific orientation of the vane 64 that corresponds with the aerodynamic shape of the vane 64. The clamp section 104 holds and defines an angular orientation of each of the plurality of vanes 64 relative to each of the outer and inner fairings 70, 72.

The clamp post 108 that supports a surface of the vane 64 and also a clamp portion 106 including a clamp surface 112 that engages an opposite end of the vane 64 and is utilized to hold the vane 64 in contact with the clamp post 108 and the locating pins 94 and 98.

Figure 12:
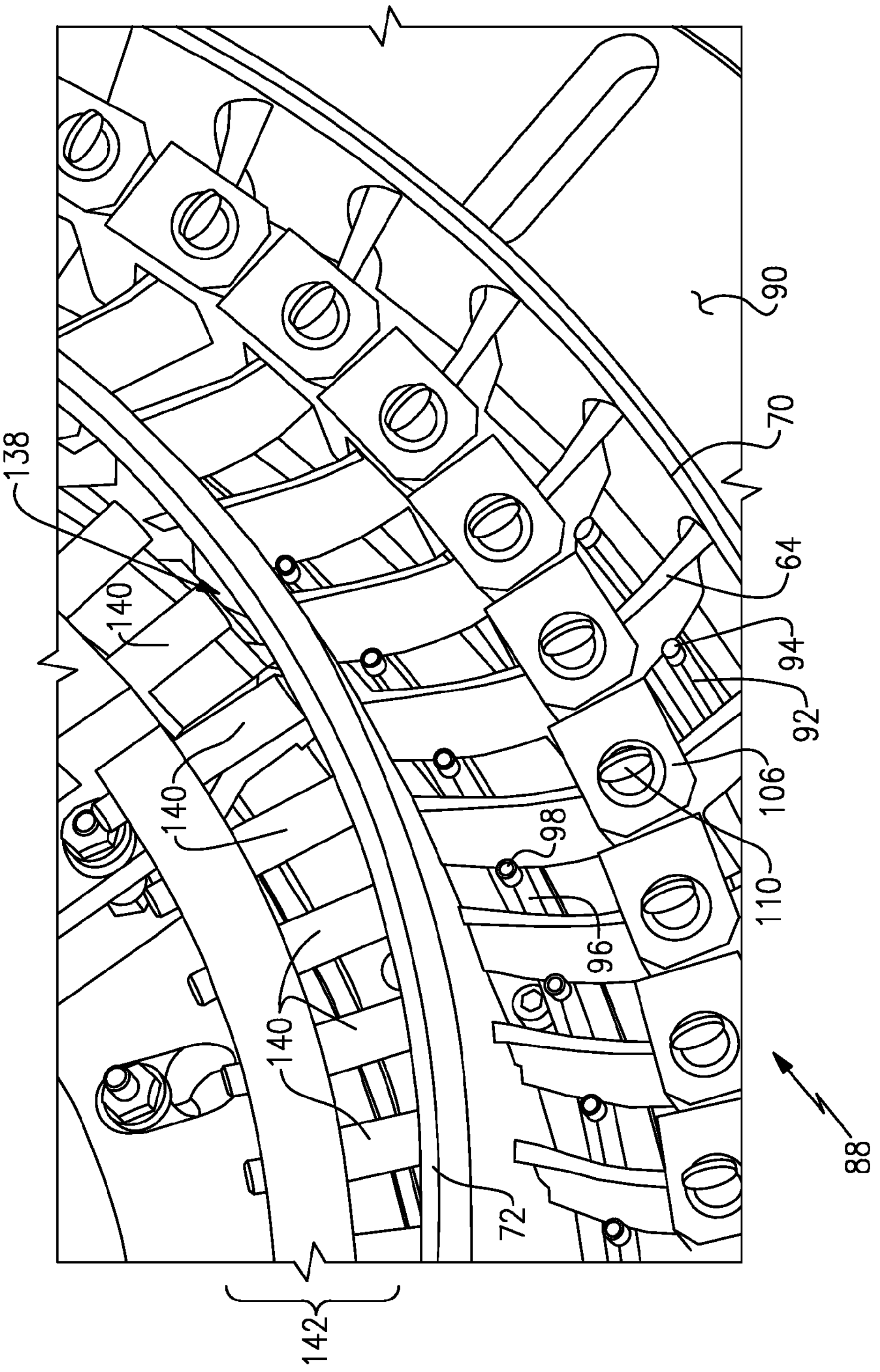
FIG. 12 is a perspective view showing the establishment of another datum point defining a desired datum plane.

Referring to FIG. 12, with continued reference to FIGS. 8*a* and 8*b*, the radial location of each of the vanes 64 is defined by radial locating pins 140 within the radial positioning section 142. An inner end 80 of each of the vanes 64 engages the surface of each of the corresponding radial locator pins 140 to define and set a desired radial position of each of the vanes 64 in relation to the corresponding outer and inner fairings 70, 72.

FIG. 12 further shows a top view of the clamp section 104 where the clamp portions 106 are held to a corresponding clamp post 108 by a clamp fastener 110. Each of the clamp fasteners 110 provides for securement of the corresponding vane 64 independent of the other vanes 64.

In operation, the example fixture 88 is utilized to define the relative position between the outer and inner fairings 70, 72 prior to application of the sealant 76. The individual vanes 64 are inserted into the fixture 88 after the corresponding outer and inner fairings 70, 72 are mounted to the base plate 90. The outer and inner and outer fairings 70, 72 are aligned on the base plate 90 utilizing the locating pins 124 and 126.

The outer fairing 70 is then secured utilizing the outer clamp 114 and the inner fairing 72 is secured the inner clamp 116. With the inner and outer fairings 70, 72 secured in place; each of the plurality of vanes 64 is inserted into the fixture 88. The vanes 64 are inserted through the opening 74 within the outer fairing 70 radially inward until abutting the radial locating pin 140. Once the vanes 64 are inserted and abutted against the radial locating pin 140, the clamp portion 106 of the clamp section 104 is secured to bias and hold the vane 64 against the locating pins 98 and 94 on corresponding inner and outer locating rings 92, 96. The clamp portion 106 also secures and holds the vane assembly 64 against the corresponding inner locating ring surface 100 and outer locating surface 102.

With each of the vanes 64 held in a desired position relative to the corresponding outer and inner fairings 70, 72, the sealant 76 can be applied to the gaps between each of the vanes 64 and the corresponding fairings 70. 72. The sealant 76 is applied within the gap to secure the vane 64 within the outer and inner fairings 70, 72 and also to eliminate vibratory transmission between parts.

The example fixture 88 is comprised of a material compatible with the conditions utilized for curing the sealant 76 within the openings 74. Once the sealant 76 has properly cured the stator vane assembly 68 can be removed from the fixture 88. Removal of the vane assembly from the fixture includes removal of the clamp portions 106 from the clamp section 104. Once the clamp portions 106 are removed, the outer clamps 114 and the inner clamps 116 can be removed to allow the completed stator vane assembly 68 to be lifted upwardly off of the base plate 90.

Accordingly, the example fixture 88 provides for the specific positioning of each of a plurality of vanes 64 relative to the outer and inner fairings 70, 72 such that sealant 76 can be applied to hold each of the vanes 64 within the assembly. Further, the example fixture 88 defines the specific datum points and planes that are utilized to align each of the vanes 64 relative to adjacent vanes 64 and the outer and inner fairings 70, 72.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A method of assembling a gas turbine engine front architecture comprising the steps of:

securing inner and outer fairings within a fixture relative to one another;

securing multiple vanes between the inner and outer fairing within the fixture, wherein securing the multiple vanes includes positioning each of the multiple vanes within an opening of the inner fairing and an opening of the outer fairings such that no part of the multiple vanes are in direct engagement with the inner fairing and the outer fairing;

applying a curable material at an interface between each of the multiple vanes and the inner and outer fairings;

curing the curable material while maintaining a relative position between the multiple vanes and the inner and outer fairings, wherein the curable material remains flexible once cured;

and releasing the multiple vanes and the inner and outer fairings from the fixture.

2. The method as recited in claim 1, including positioning each of the multiple vanes by defining a first plane with at least three (3) contact points on the fixture, a second plane with at least two (2) contact points on the fixture and a third plane with at least one (1) contact point defined on the fixture.

3. The method as recited in claim 2, including defining the first plane with an outer locator pin on an outer locating ring of the fixture, an inner locator pin on an inner locating ring and a clamp disposed between the inner and outer locating rings.

4. The method as recited in claim 3, including a single clamp for holding each of the vanes in position.

5. The method as recited in claim 4, wherein the single clamp is disposed between the inner locating pin and the outer locating pin and includes a clamp portion supported on a clamp pin with the vane being clamped between the clamp portion and the clamp pin.

6. The method as recited in claim 3, including defining the second plane with a surface of the outer locating ring and the inner locating ring.

7. The method as recited in claim 3, including defining the third plane with a radial locating pin supported radially inward of the inner fairing.

8. The method as recited in claim 1, wherein the plurality of vanes are held within the fixture during curing of the curable material.

* * * * *